No. 780,651. PATENTED JAN. 24, 1905.
J. M. A. GÉRARD.
PROCESS OF SEPARATING METALS FROM THEIR ORES.
APPLICATION FILED JAN. 27, 1902.
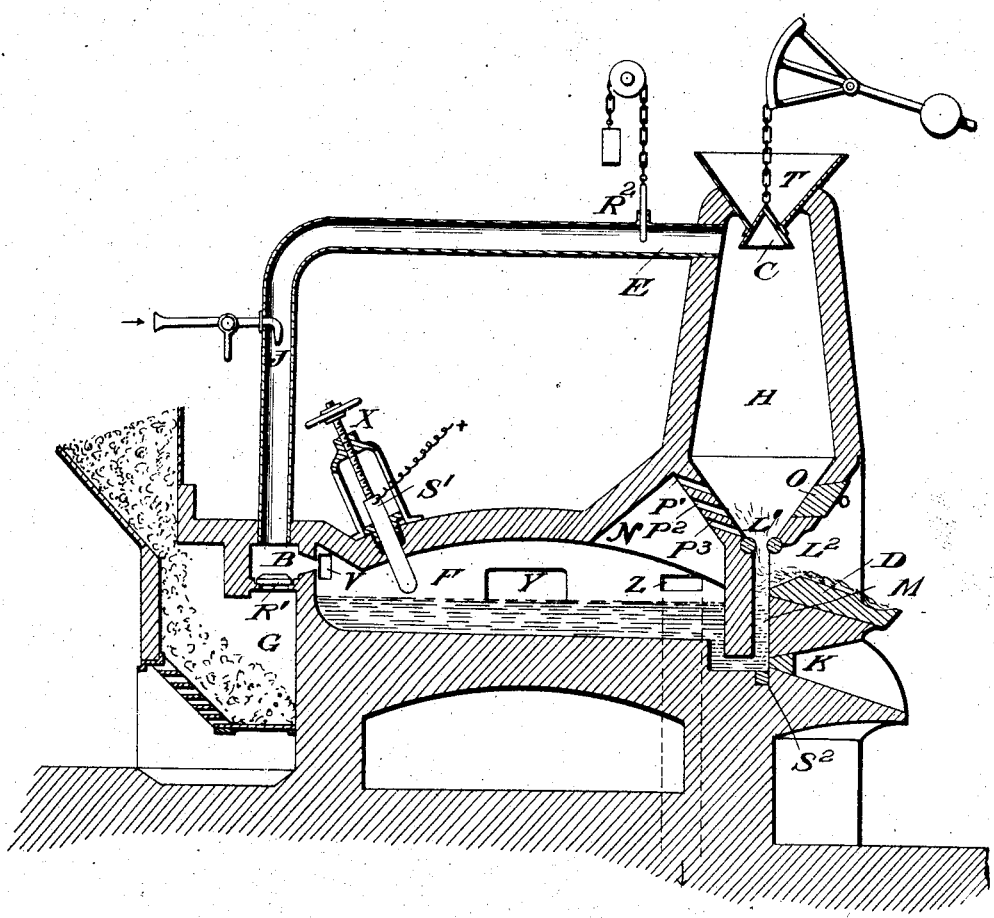

No. 780,651. Patented January 24, 1905.

UNITED STATES PATENT OFFICE.

JEAN MARIE ANATOLE GÉRARD, OF PARIS, FRANCE, ASSIGNOR TO SYNDICAT DE L'ACIER GERARD, OF PARIS, FRANCE, A CORPORATION OF FRANCE.

PROCESS OF SEPARATING METALS FROM THEIR ORES.

SPECIFICATION forming part of Letters Patent No. 780,651, dated January 24, 1905.

Application filed January 27, 1902. Serial No. 91,537.

*To all whom it may concern:*

Be it known that I, JEAN MARIE ANATOLE GÉRARD, engineer, a citizen of the Republic of France, residing 16 Rue des Grandes Carrières, Paris, in the Republic of France, have invented certain new and useful Improvements in Processes of Separating Metals from Their Ores and Electrically Refining the Metals, of which the following is a specification.

The present invention relates to an electric-furnace process for the production of metals, and especially for the production of steel direct from its ore in a rapid and economical manner. In order to attain this result, the ore previously mixed with carbonaceous material and flux is reduced at a moderate temperature. In the case of iron the ore is reduced to a sponge. The reduced mass is then smelted by means of an electric current and the slag separated from the metal, which is conducted in its molten state to a refining-furnace, in the bottom of which is a suitable electrode connected to the negative pole of an electric circuit. In the top of the refining-furnace is an adjustable electrode connected with the corresponding positive pole in the circuit. Upon immersing the positive electrode in the molten metal and the passage of an electric current of high voltage and low amperage, the surface is thrown into violent agitation or boiling and drops of metal are thrown from the surface into the oxidizing atmosphere present in the furnace. The resulting oxidation recarburizes and refines the metal. The process also involves special features for heating the ore charge by the hot gases from the refining-furnace and also for utilizing the hot gases from the reducing-furnace, all of which is more fully set forth in the detailed description, and distinctly pointed out in the claims.

In the accompanying drawing I have illustrated in vertical section a suitable shaft-furnace in connection with a refining-furnace provided with electrodes and such other accessories as are necessary for carrying out my process.

Referring to the drawing, H is a shaft or blast furnace, provided at its top with the usual cone and hopper C T. At the base of the furnace H are electrodes $L'$ $L^2$, which may be connected with a suitable source of electric current.

M is a siphon-conduit for conducting molten metal from the furnace H to the refining-furnace F. A discharge-channel D, located at the top of conduit M, permits the slag to be removed from the surface of the molten metal, which sinks to the bottom of the siphon and passes into furnace F.

At O is an opening which may be closed by a plug or other suitable means for completing the discharge of the furnace at the end of the operation.

K is draw-off for metal and is closed during the operation.

Connected with the base of the furnace H, through conduit M, is a refining-furnace F, which may, for example, be of the Marten-Siemens type. In the arch of this furnace is a chamber N, communicating with the furnace H through passages $P'$ $P^2$ $P^3$. At the opposite end of furnace F is a gas-producer which communicates with the furnace-chamber F through passage B. A register $R'$ is provided for shutting off this communication when desired. Z is an opening for escape of gases to the recuperation-chambers, (not shown,) and V a similar opening for admitting heated air for burning the gases coming from the gas-producer and reducing-furnace through passage B. A working door Y permits the furnace to be opened, if it is desired, for the operation.

In the arch of the furnace F is placed an electrode $S'$, which is connected with the positive pole of an electric circuit. Means X are provided on the outside of the furnace for raising and lowering the electrode.

A negative electrode $S^2$ is placed in the bottom of the refining-furnace F, preferably at the lower part of the siphon at the side opposed to the positive electrode. In this position it is clear of the bath of metal and the action of the heat of the fuel and that of the electric current. These electrodes may be of any suitable material and be solid or tubular and may be provided with cooling means.

The shaft or blast-furnace is provided with a gas-discharge pipe E, located just below the top and near the cone and hopper. This pipe is provided with a balanced register $R^2$ and a steam-injector J, which permits regulation of the gas-current. This pipe leads to the gas-producer at a point beyond the register $R'$. (Not shown.)

As an illustration of my process I will describe its application to the production of steel.

The ore mixed with carbonaceous material in quantities sufficient to effect reduction, together with a suitable flux when the nature of the ore requires it, is initially heated in the reducing-furnace by means of the hot gases from the producer G. When a reacting temperature is reached, these gases are shut off and a circulation of the gases from the reducing-furnace begins. The gases from the top of furnace H are drawn off through pipe E, aided in their circulation by steam-injector J, enter the refining-furnace $F'$, where they are burned by aid of air introduced near their entrance to the furnace. While passing through the refining-furnace F they heat and maintain molten the metal therein collecting from the reducing-furnace. They then pass into the reducing-furnace to yield up their heat to the charge. This cycle of operations continues till the ore is reduced to sponge. As the ore is reduced to sponge, the mass passes between electrodes $L'$ $L^2$ and is melted by the electric current, which should be of low voltage and high amperage, as well understood in the art. The fluid metal sinks in the siphon-conduit M and enters the refining-furnace, while the slag rises and passes over the notch at the top and off by passage D. When a suitable quantity of fluid metal has collected in the refining-furnace, the operation in the shaft or blast-furnace is stopped, the gases from its top are cut off, and also the steam-injector. The refining operations now begin under the action of the electric current and previously-heated air, which is introduced into the refining-furnace through V. For this purpose one electrode, $S^2$, is placed in the sole of the furnace and the other, $S'$, in the top. As shown in the drawings, the positive electrode is located in the arch of the furnace and during the operation is brought into contact with the mass of molten metal in the furnace by regulating, as may be desirable, the extent to which the electrode is immersed in the mass. A current of high voltage and low amperage is passed into the bath, which causes a vigorous ebullition and projection of the globules of the metal above the surface, the effect of which is to increase the surface to the oxidizing-gases in the furnace and to stir or puddle the metal. The result of this operation is to refine the metal and permit its removal from the oven in a very short time.

The current necessary to effect the stirring or puddling of the refining-bath is more or less variable, depending on the mass to be treated and the number of electrodes employed. From seventy-five volts to at least double that, or one hundred and fifty, give satisfactory results. As to the amperage, it is only limited by the section presented by the electrodes. A density of about ten amperes per square centimeter cross-section is generally sufficient.

The air introduced into the refining-furnace through V may be heated in any suitable manner. The gaseous products during the refining operation are taken off through opening Z. The air-inlet in the refining-furnace is so arranged that the hot air will mingle with the carbon monoxid and steam at the entrance of the refining-furnace and pass its full length before entering the reducing-furnace.

In the practical operation of this process one or more refining-furnaces, such as F, may be combined with one or more blast-furnaces, such as H, and connected to this latter by means of a siphon or by special orifices in such a manner that molten metal will be admitted directly upon the bed of the refining-furnace and that the gases which have served for heating the refining-furnace can be afterward used for heating the blast-furnace. It is consequently not necessary to keep on working the gas-producer.

It should be particularly noted that the present invention is applicable not only to the extraction and refining of metals similar to iron, but also to other metals, being specially characterized by the particular method of employment of the electric current in the reduction of the mineral and the refining of the metal.

What is claimed is—

1. The process of producing metals from their ores, consisting in heating a mixture of ore and carbonaceous material to reduce the ore to a metal sponge, passing through the latter an electric current to melt the same, and then subjecting the molten metal to an electric current of high voltage and low amperage in the presence of an oxidizing-gas, whereby the metal is made to boil and rapid oxidation is effected.

2. The process of producing metals from their ores, consisting in heating a mixture of ore, flux and carbonaceous material to reduce the ore to a metal sponge, passing through the resulting product an electric current to melt the same, separating the slag from the metal, and subjecting the fluid metal to the action of an electric current of high voltage and low amperage in the presence of an oxidizing-gas, whereby the metal is made to boil and rapid oxidation is effected.

3. The process of producing steel from its ores, consisting in heating a mixture of iron ore, flux and carbonaceous material to reduce the ore to a metal sponge, passing through the resulting product an electric current of low voltage and high amperage to melt the same, separating the slag from the molten metal, and subjecting the latter to the action of an electric current of high voltage and low amperage in the presence of an oxidizing-gas, whereby the metal is made to boil and rapid oxidation is effected.

4. The process of producing steel from its ores, consisting in heating a mixture of iron ore and carbonaceous material in quantity sufficient to reduce the ore to a metal sponge, passing through the latter an electric current of low voltage and high amperage to melt the same, and then subjecting the molten metal to the action of an electric current of high voltage and low amperage in the presence of an oxidizing-gas, whereby the metal is made to boil and rapid oxidation is effected.

5. The process of producing steel, consisting in reducing iron ore to sponge, melting the latter by passing through it an electric current and then boiling the metal by passing therethrough an electric current of high voltage and low amperage while submitting the surface of the metal to an oxidizing-gas.

6. The process of producing metals from their ores, consisting in reducing a charge of ore and carbonaceous material to metal sponge in a shaft-furnace, melting the sponge by passing through it an electric current, collecting the molten metal in a refining-furnace, withdrawing the hot gases from the charge in the shaft-furnace, passing them through the refining-furnace while collecting the molten metal therein, thence through the ore charge to maintain the same at a reacting temperature and finally boiling the metal in the presence of an oxidizing-gas by passing therethrough an electric current of high voltage and low amperage.

7. The process of producing metals from their ores consisting in reducing the ore to a metal sponge, passing an electric current through the sponge to melt the same and while molten passing an electric current of high voltage and low amperage through the molten metal from an electrode in contact with the surface of the same, whereby portions of the metal are projected above the surface and simultaneously submitting said metal to an oxidizing-gas.

In witness whereof I have hereunto signed my name, this 14th day of January, 1902, in the presence of two subscribing witnesses.

JEAN MARIE ANATOLE GÉRARD.

Witnesses:
ADAM DOMER,
PAUL FOURNOL.